United States Patent
Banach et al.

(10) Patent No.: US 8,030,418 B2
(45) Date of Patent: Oct. 4, 2011

(54) MODIFIED HYDROCARBYLPHENOL-ALDEHYDE RESINS FOR USE AS TACKIFIERS AND RUBBER COMPOSITIONS CONTAINING THEM

(75) Inventors: Timothy E. Banach, Scotia, NY (US); L. Scott Howard, Ballston Spa, NY (US); Todd Scott Makenzie, Gansevoort, NY (US); Ronald K. Smith, Pattersonville, NY (US)

(73) Assignee: SI Group, Inc., Schenectady, NY (US)

( * ) Notice: Subject to any disclaimer, the term of this patent is extended or adjusted under 35 U.S.C. 154(b) by 0 days.

(21) Appl. No.: 11/849,753

(22) Filed: Sep. 4, 2007

(65) Prior Publication Data

US 2008/0275186 A1   Nov. 6, 2008

Related U.S. Application Data

(60) Provisional application No. 60/842,160, filed on Sep. 5, 2006.

(51) Int. Cl.
*C08G 8/28* (2006.01)
*C08L 61/06* (2006.01)
*C08L 61/14* (2006.01)

(52) U.S. Cl. ........................................ 525/504; 525/507
(58) Field of Classification Search ............ 525/138
See application file for complete search history.

(56) References Cited

U.S. PATENT DOCUMENTS

| | | | |
|---|---|---|---|
| 2,040,039 A | | 5/1936 | Bruson et al. |
| 2,040,040 A | | 5/1936 | Bruson et al. |
| 2,997,445 A | | 8/1961 | Nuhn |
| 3,001,999 A | | 9/1961 | Geschickter et al. |
| 3,173,952 A | | 3/1965 | Farrar |
| 4,054,554 A | * | 10/1977 | Buriks et al. .................. 525/507 |
| 4,073,826 A | * | 2/1978 | Galkiewicz et al. .......... 525/120 |
| 4,146,512 A | | 3/1979 | Weaver et al. |
| 4,146,513 A | | 3/1979 | Weaver et al. |
| 4,167,540 A | | 9/1979 | Giller et al. |
| 4,647,328 A | * | 3/1987 | Rhee .......................... 156/128.1 |
| 6,420,496 B1 | | 7/2002 | Moon et al. |
| 6,642,345 B2 | | 11/2003 | Yuasa et al. |
| 7,329,697 B2 | * | 2/2008 | Waddell et al. ................ 524/47 |
| 2004/0242731 A1 | * | 12/2004 | Waddell et al. ................ 524/47 |

FOREIGN PATENT DOCUMENTS

| | | |
|---|---|---|
| DE | 2 320 526 | 11/1974 |
| WO | 00/08082 | 2/2000 |
| WO | WO-00/08082 | 2/2000 |

OTHER PUBLICATIONS

International Search Report for PCT/US2007/019271 Dated Jan. 7, 2008.

* cited by examiner

*Primary Examiner* — Randy Gulakowski
*Assistant Examiner* — Mike M Dollinger
(74) *Attorney, Agent, or Firm* — Jeffrey N. Townes; LeClairRyan

(57) ABSTRACT

The invention relates to a modified hydrocarbylphenol-aldehyde resin prepared by reacting a hydrocarbylphenol-aldehyde resin with a primary or secondary amine and further with an epoxide. The invention also provides a process for preparing a modified, hydrocarbylphenol-aldehyde resin and a rubber composition containing such resin.

20 Claims, No Drawings

MODIFIED HYDROCARBYLPHENOL-ALDEHYDE RESINS FOR USE AS TACKIFIERS AND RUBBER COMPOSITIONS CONTAINING THEM

RELATED APPLICATIONS

This application claims priority under 35 U.S.C. §119(e) to U.S. Provisional Patent Application No. 60/842,160, filed Sep. 5, 2006, hereby incorporated by reference in its entirety.

FIELD OF INVENTION

This invention relates to modified hydrocarbylphenol-aldehyde resins useful as tackifiers in rubber and a process for preparing such resins. In particular, the invention relates to hydrocarbylphenol-aldehyde resins modified with primary or secondary amines and then further modified with an expoxide.

BACKGROUND OF THE INVENTION

Rubber products today are made from natural rubber and synthetic rubber or blends thereof. Natural rubber (NR) differs from synthetic rubber. Natural rubber is made from the milk of the rubber tree. This rubber milk, called latex, is a colloidal dispersion in an aqueous medium. Only small percentage of the latex is used directly and the greatest part is processed into hard rubber. Among many different types of synthetic rubbers, the most common synthetic rubbers are SBR (styrene butadiene rubber), BR (butadiene rubber), EPDM (ethylene propylene diene rubber), IR (isoprene rubber), IIR (isoprene isobutylene rubber), NBR (acrylonitrile butadiene rubber), SIS (styrene isoprene styrene), SBS (styrene butadiene styrene) and CR (poly-2-chlorobutadiene). Examples of rubber products include, but are not limited to, conveyor belts, flat and vee-belts, tires, sole material, sheet material, and punching products.

Rubber products are frequently made up of several rubber layers each with the same or a different chemical composition. During this "build up", the rubber layers must adhere to one another adequately in their pre-vulcanized state. For example, an assembled tire blank is required to hold together for a fairly long period prior to vulcanization. It is therefore important that the rubber mixtures used have an adequate "tack." The property termed "tack" is defined as the force required to pull apart two pre-vulcanized rubber mixtures which have been pressed together under certain defined conditions. While natural rubber mixtures generally have good tackiness, mixtures of synthetic rubbers are much less tacky and, in extreme cases, possess no tackiness at all. Therefore, it has been common practice to add a tackifier to less tacky rubbers or rubber mixtures to increase their tack. In synthetic rubber products, synthetic rubber adhesive compositions are employed to improve tack and provide good cured adhesion.

Rubber compositions containing a tackifier are generally formulated in internal mixers or on sets of rollers from a natural or synthetic rubber (e.g. styrene-butadiene copolymers, polybutadiene) or mixtures thereof. Rubber compositions also typically contain additives known in the art such as fillers, processing agents and vulcanizing agents. After formulation, the rubber composition is then used to manufacture a desired rubber product. As mentioned above, the rubber composition must remain sufficiently tacky during the manufacturing process, even when the process is interrupted for fairly long periods, which is not unusual particularly when manufacturing involves processes at different locations or requires storage and/or transport of pre-finished goods.

Even though a number of different materials are currently used as tackifiers, there remains a need to develop tackifiers which provides rubber compositions with increased tack. A particular need exists in the tire industry because of the poor tack of synthetic rubber compositions, such as commercial SBR-based tire compositions.

This invention answers that need. Tackifying resins of the invention, modified hydrocarbylphenol-aldehyde resins, have improved tack performing as good as or better than current tackifiers. The invention also provides a process for preparing modified hydrocarbylphenol-aldehyde resins and an improved rubber composition containing such resin.

SUMMARY OF THE INVENTION

The invention relates to a modified hydrocarbylphenol-aldehyde resin prepared by reacting a hydrocarbylphenol-aldehyde resin with a primary or secondary amine and further with an epoxide. More particularly, the primary or secondary amine is one suitable for use in a Mannich condensation reaction with a hydrocarbylphenol-aldehyde resin. A process for preparing a modified, hydrocarbylphenol-aldehyde resin is another embodiment of the invention. In another aspect, the invention relates to a rubber composition having improved tack comprising a rubber or mixtures of rubbers with a modified hydrocarbylphenol-aldehyde resin of the invention.

DETAILED DESCRIPTION OF THE INVENTION

The invention is directed to a modified hydrocarbylphenol-aldehyde resin prepared by reacting a hydrocarbylphenol-aldehyde resin with a primary or secondary amine and further with an epoxide, preferably, an epoxide of $C_4$-$C_{60}$-olefin. A hydrocarbylphenol-aldehyde resin modified with a primary or secondary amine, Formula (I) below, is reacted with of an epoxide, preferably about 1 to about 25 weight percent, in the presence of a basic catalyst and at a basic pH.

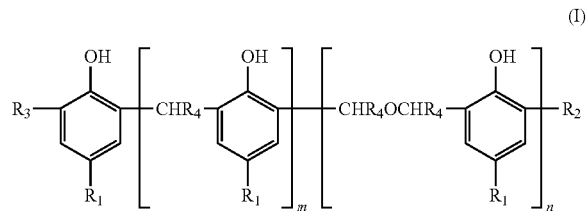

(I)

wherein
$R_1$ is a straight or branched $C_1$-$C_{30}$ alkyl;
$R_2$ is —$CHR_5$,
    wherein $R_5$ is an amine containing an amino group having at least one active hydrogen atom of the formula (i)

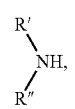

(i)

wherein R' and R" are independently H, $C_1$-$C_6$ alkyl, $C_2$-$C_6$ alkenyl, $C_2$-$C_6$ alkynyl, or wherein R' and R", together with the N carrying them, form a 5-7 membered heterocyclic ring; or an alkylene polyamine of the formula (ii)

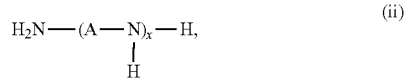

wherein A is a divalent alkylene radical having 2 to 6 carbon atoms and x is an integer from 1 to 10;

$R_3$ is $R_2$ or a mixture of $R_2$ and H and/or —$CHR_5OH$;

$R_4$ is H or $C_1$-$C_4$ alkyl; and m plus n is at least 1.

The term "hydrocarbyl phenol-aldehyde resin" generally refers to a resin prepared reaction product of a hydrocarbylphenol with an aldehyde.

The term "hydrocarbylphenol" refers to a compound that includes at least one hydroxy functional group attached to a carbon atom of an aromatic ring and having at least one hydrocarbyl substituent. Illustrative hydrocarbyl phenols include, but are not limited to alkylated phenols and multi-hydroxy phenols, and hydroxy-substituted multi-ring aromatics. Illustrative alkylated phenols include methylphenol (also known as cresol), dimethylphenol (also known as xylenol), 2-ethylphenol, pentylphenol and tert-butyl phenol. "Multi-hydroxy phenolic compound" means a compound that includes more than one hydroxy group on each aromatic ring. Illustrative multi-hydroxy phenols include 1,3-benzenediol (also known as resorcinol), 1,2-benzenediol (also known as pyrocatechol), 1,4-benzenediol (also known as hydroquinone), 1,2,3-benzenetriol (also known as pyrogallol), 1,3,5-benzenetriol and 4-tert-butyl-1,2-benzenediol (also known as tert-butyl catechol). Illustrative hydroxy-substituted multi-ring aromatics include 4,4'-isopropylidenebisphenol (also known as bisphenol A), 4,4'methylidenebisphenol (also known as bisphenol F) and naphthol.

The term "hydrocarbyl" means a hydrocarbon substituent including aliphatic (straight-chain and branched-chain), and a cyclic substituent such as alicyclic, aromatic, and cyclic terpenes. Preferably, the hydrocarbyl group of the hydrocarbylphenol-aldehyde resin is a straight or branched $C_1$-$C_{30}$ alkyl group. More preferably, the hydrocarbyl group is a straight or branched $C_1$-$C_{15}$ alkyl group. Most preferably, the hydrocarbyl group is butyl or octyl. The hydrocarbyl group may be substituted with common functional groups such as hydroxyl groups, amino groups, carboxylic groups, halogens, thiol groups, disulfide groups, etc. The functional groups should not impair the tackifying properties of the modified, hydrocarbylphenol-aldehyde resin of the invention or of a rubber composition to which the resin is added. Preferably, any functional group is chosen to add beneficial properties to the resin for manufacturing purposes, for increased tack, or for improving the properties of the rubber composition to which it is added.

An "aldehyde" is a compound having the generic formula RCHO. Illustrative aldehyde compounds include formaldehyde, acetaldehyde, propionaldehyde, n-butylaldehyde, n-valeraldehyde, caproaldehyde, heptaldehyde and other straight-chain aldehydes having up to 8 carbon atoms, as well as compounds that decompose to formaldehyde such as paraformaldehyde, trioxane, furfural, hexamethylenetriamine, benzaldehyde, aldol (β-hydroxybutraldehyde), acetals that liberate formaldehyde on heating.

Hydrocarbylphenol-aldehyde resins are known in the art. Any hydrocarbylphenol-aldehyde resin may be used to form the modified resins of the invention. Preferred hydrocarbylphenol-aldehyde resins useful in this invention are the condensation products from the interaction between phenol, C-alkyl substituted phenols (including cresols, xylenols, p-tert-butyl-phenol, p-phenylphenol and nonyl phenols), diphenols, e.g. bisphenol-A (2,2-bis(4-hydroxyphenyl)propane), and aldehydes such as formaldehyde, acetaldehyde, chloral and furfuraldehyde.

The polymerization of phenols with formaldehyde to prepare hydrocarbylphenol-aldehyde resins is well known in the art. The type of catalyst and the molar ratio of the reactants used in the preparation of phenolic resins determines their molecular structure and therefore the physical properties of the resin. An aldehyde:phenol ratio between 0.5:1 and 1:0.1 usually 0.5:1 to 0.8:1, and an acid catalyst is used to prepare those phenolic resins generally known as novolak resins which are thermoplastic in character. Higher aldehyde:phenol ratios of more than 1:1 to 3:1, and a basic catalyst give rise to a class of phenolic resins known as resoles, and these are characterized by their ability to be thermally hardened at elevated temperatures. Both these classes of hydrocarbylphenol-aldehyde resins, novolak and resoles, are useful in this invention.

The highly exothermic condensation reaction, the so called "novolak condensation", is carried out by a method that hydrocarbylphenols react with aldehydes or ketones, especially formaldehyde, in the presence of catalysts, as a rule in the presence of acids, to form hydrocarbylphenol-aldehyde novolak resins (U.S. Pat. Nos. 4,167,540; 6,642,345). Preferably, the hydrocarbylphenol-aldehyde novolak resins are a line of novolak resins manufactured by SI Group of Schenectady, N.Y., such as the SP-1068, HRJ-2765, HRJ-4047, HRJ-10420, CRJ-418, HRJ-2355, SMD 31144, and HRJ-11937 resins.

Base-catalysed phenol formaldehyde resins, resole resins, are made with an aldehyde to phenol ratio of greater than one (usually around 1.5). For example, phenol, formaldehyde, water and catalyst are mixed in the desired amount, depending on the resin to be formed, and are then heated. Although any base can be used from caustic NaOH to amines, preferably the base is TEA (triethylamine) or TEAOH (triethanolamine). The first part of the reaction, at around 70° C., forms hydroxymethyl phenols. Hydroxymethyl phenols will crosslink on heating to around 120° C. to form methylene and methyl ether bridges. It is this highly crosslinked nature of phenolic resin which gives them their hardness and their excellent thermal stability, thermosets, and which makes them impervious to most chemical attack and solvation. Preferably, the hydrocarbylphenol-aldehyde resole resins are a line of resole resins manufactured by Schenectady International Inc., such as SP-1045, SP-1055 and SP-1056 resins.

Representative amine reactants used to prepare the modified hydrocarbylphenol-aldehyde resins of the invention are primary or secondary amines, which are suitable for use in a Mannich condensation reaction. As mentioned above with regard to Formula (I), the amine moiety may have alkyl, alkenyl, alkynyl, or aryl substituents. The amine may also be a cycliclic amine which may be saturated or unsaturated, aromatic, or contain other heteroatoms in addition to the amine nitrogen. The amine may further be a polyamine. Examples of such amines are, but are not limited to, mono and di-amino alkanes and their substituted analogs, e.g., ethylamine, dimethylamine, dimethylaminopropyl amine and diethanol amine; aryl amines and diamines, e.g., aniline, naphthylamine, benzyl amine, phenylene diamine, diamino naphthalenes; heterocyclic amines, e.g., morpholine, pyrrole, pyrrolidine, imidazole, imidazolidine, and piperidine;

melamine and their substituted analogs. Other representative amines are alkylene polyamines, principally polyethylene polyamines. Suitable alkylene polyamine reactants include ethylenediamine, diethylene triamine, triethylene tetramine, tetraethylene pentamine, pentaethylene hexamine, hexaethylene heptamine, heptaethylene octamine, octaethylene nonamine, nonaethylene decamine, decaethylene undecamine and mixtures of such amines having nitrogen contents corresponding to the alkylene polyamines. Corresponding propylene polyamines such as propylene diamine and di-, tri-, tetra-, penta-propylene tri-, tetra-, penta- and hexa-amines are also suitable reactants. Morpholine is a particularly preferred amine for use in this invention.

The reaction of primary and secondary amines, in particular morpholine, with hydrocarbylphenol-aldehyde resins via a Mannich reaction is known in the art. U.S. Pat. Nos. 2,040,039 and 2,040,040 disclose the ease of the condensation of alkylated phenol, formaldehyde and morpholine to form the corresponding morpholinomethylenephenols. U.S. Pat. No. 3,001,999 discloses the reaction of p-alkylphenol with formaldehyde and amines, including morpholine. U.S. Pat. Nos. 3,173,952 and 2,997,445 disclose the aminoalkylation of dialkylphenols; German Patent No. 2,320,526 discloses aminoalkylation using diethanolamine. U.S. Pat. Nos. 4,146,512 and 4,146,513 disclose that aminomethylene terminated alkylphenols and polymers thereof, when the amine group is morpholine or amines which can be dehydrated to morpholine such as diethanolamine and di-2-hydroxy propylamine, impart good tack properties to uncured rubber and provide good tack retention.

After modified with the primary or secondary amine, the hydrocarbylphenol-aldehyde resin is further modified with an epoxide, preferably an epoxide of $C_4$-$C_{60}$ α-olefin. The hydroxyl functionality remaining on the hydrocarbylphenol-formaldehyde resin reacts with the epoxide. The resulting resins shows increased tack when used in a rubber composition. The epoxide used in the invention is preferably an expoxide of a $C_4$-$C_{60}$ α-olefin, more preferably a straight chain $C_4$-$C_{22}$ epoxide, and even more preferably, a straight chain $C_6$-$C_{16}$ epoxide.

The invention also provides a process for producing a modified, hydrocarbylphenol-aldehyde resin. The process for preparing a modified, hydrocarbylphenol-aldehyde resin having improved tack comprises the step of:

(a) reacting an epoxide, preferably about 1 to about 25 weight percent, in the presence of a basic catalyst and at a basic pH, with an amine-modified hydrocarbylphenol-aldehyde resin of the Formula (I)

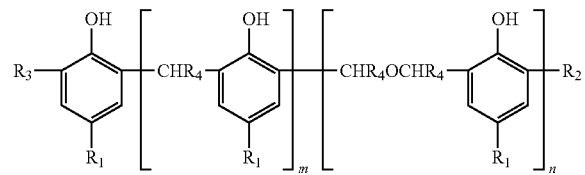

(I)

wherein
$R_1$ is a straight or branched $C_1$-$C_{30}$ alkyl;
$R_2$ is —$CHR_5$,
wherein $R_5$ is an amine containing an amino group having at least one active hydrogen atom of the formula (i)

(i)

wherein R' and R" are independently H, $C_1$-$C_6$ alkyl, $C_2$-$C_6$ alkenyl, $C_2$-$C_6$ alkynyl, aryl, or wherein R' and R", together with the N carrying them, form a 5-7 membered heterocyclic ring; or
an alkylene polyamine of the formula (ii)

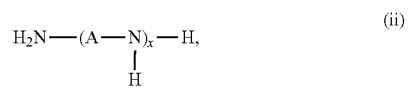

(ii)

wherein A is a divalent alkylene radical having 2 to 6 carbon atoms and x is an integer from 1 to 10;
$R_3$ is $R_2$ or a mixture of $R_2$ and H and/or —$CHR_5OH$;
$R_4$ is H or $C_1$-$C_4$ alkyl; and
m plus n is at least 1.

As mentioned above, any hydrocarbylphenol-aldehyde novolak resin or resole resin may be used to form the modified resins of the invention. The resin is first modified with an amine to form resin such as in Formula (I) followed by epoxide modification. The reactions may be carried out sequentially in a single reaction vessel or as separate reactions isolating each or a desired intermediate product. The modification process is carried out in a reactor, for example a customary vessel or glass flask which is equipped with a stirrer, heater, thermostat, feeding device, reflux condenser and water separator. The hydrocarbylphenols may be initially introduced with the catalyst and brought to the desired reaction temperature or distillation temperature, and the aldehydes or ketones, preferably for example aqueous formaldehyde solution, is added over a period of a few hours. It is also possible to initially introduce only a part of the hydrocarbylphenols and to add the rest along with the formaldehyde at 90-150° C.

Modified, hydrocarbylphenol-aldehyde resins prepared according to the invention are useful as tackifiers in rubber compositions. In this embodiment of the invention a modified, hydrocarbylphenol-aldehyde resin is added to a rubber composition to improved the tack of the rubber. The rubber composition may be any natural rubber, synthetic rubber or a mixture thereof, such as discussed above. A modified, hydrocarbylphenol-aldehyde resin according to the invention may be added to a rubber composition in the same amount, in the same manner and for the same uses as other known tackifiers. Preferably, the modified resin is used in amount ranging from 0.5 to 7 phr, and more preferably from 1 to 4 phr. A single modified resin according to the invention or a mixtures of the resins may be incorporated in the rubber composition. Accordingly, rubber compositions containing a modified, hydrocarbylphenol-aldehyde resin is another embodiment of the invention. Rubbers can be used in any desired supplied form, for example as bales or powders and also, for example, with carbon black. Other customary additives may also be used in a rubber composition of the invention. These additives include, but are not limited to, fillers, vulcanizing agents, accelerators, activators and processing auxiliaries. The vulcanizates obtained containing a modified, hydrocarbylphenol-aldehyde resin according to the invention can, for example, be used as industrial rubber goods, such as damping elements, rubber sleeves, bellows, conveyor belts and also for vehicle tires.

The process of the invention is further illustrated with reference to the following examples. The following tackifying resins were used for comparison in the examples below. All are available from SI Group, Schenectady, N.Y.

T8000 tackifier, a t-Octylphenol formaldehyde tackifying resin
T2300 tackifier, a t-Butylphenol formaldehyde resin;
T6000 tackifier, a t-Octylphenol formaldehyde resin; and
T2000 tackifier, a t-Butylphenol formaldehyde resin.

EXAMPLE 1

Preparation of Modified Hydrocarbylphenol-Formaldehyde Resins

Preparation 1 of a Modified Octyl Phenol-Formaldehyde Novolak Resin, "Resin O"

A hydrocarbylphenol-formaldehyde novolak resin was prepared by reacting 100 pounds p-tertiary octylphenol and 27 pounds of 50% aqueous formaldehyde in the presence of 69 grams of an acidic catalyst, (DDBSA (dodecyl benzene sulfonic acid)), heated to 90° to 110° C. with agitation. This reaction, a "novolak condensation," was held for 1 to 3 hours.

After the novolak condensation was complete, the pH of the reaction mixture was switched to a basic pH by addition of triethanolamine for subsequent reaction of the hydrocarbylphenol-formaldehyde novolak resin with morpholine. 9 pounds of morpholine was added to the reaction mixture and then 6.25 pounds of 50% formaldehyde was slowly added to the reaction mixture and reacted over 1 hour. Reaction times of about 0.5 to about 5 hours, with typical reaction times of about 2 hours.

Epoxy modification: 25 pounds of 1,2 epoxyhexadecane was added to the reaction mixture. After the reaction was complete, the contents were vacuum distilled to a temperature of 180° C. at 25-29 mbar vacuum to remove any residual material.

Preparation 2 of a Modified Octylphenol-Formaldehyde Resole Resin, "Resin O"

The starting material, a p-tertiary octyl phenol-formaldehyde resole resin, was the commercially available resole resin, SP 1045, manufactured by SI Group. The first step of the preparation was a modification of a hydrocarbylphenol-formaldehyde resole resin, SP 1045, with morpholine. 1000 g of SP 1045 was reacted with 100 grams morpholine in the presence of 50 grams of triethylamine as a catalyst. The reaction mixture was heated to 50 to 100° C. to ensure complete reaction, about 1 hour. Reaction times of about 0.5 to about 5 hours, with typical reaction times of about 2 hours. When the reaction was complete, the catalyst was removed via vacuum distillation.

Epoxy modification: 100 grams of 1,2 epoxyhexadecane was added to the reaction mixture and after the reaction was complete, the contents were vacuum distilled.

Preparation 3 of a Modified Octyl Phenol-Formaldehyde Novolak Resin, "Resin O", In Situ To form an initial reaction mixture 1000 gram of p-tertiary octyl phenol, 100 g of morpholine and 10 g NaOH were combined. The reaction mixture was heated to 90° C. 288 gram of 50% aqueous formaldehyde solution was then added to the reaction mixture and the reaction mixtures were held at 90° C. for 1 to 5 hours. 10 gram of 98% sulfuric acid was then added to the reaction mixture to convert the in situ resin to a novolak resin. The contents were vacuum distilled to 150° C.

Epoxy modification: 100 grams of 1,2 epoxyhexadecane was added to the reaction mixture and after the reaction was complete, the contents were vacuum distilled.

Preparation of a Modified Butyl Phenol-Formaldehyde Novolak Resin, "Resin B"

Modified butyl phenol-formaldehyde resins of the invention were prepared in the same manner as described above for Resin O, only substituting p-tertiary butyl phenol for p-tertiary octyl phenol or an p-tertiary butyl phenol-formaldehyde resole resin in the above methods. These are general methods for the preparation of modified hydrocarbylphenol resins of the invention.

EXAMPLE 2

Preparation and Evaluation of Rubber Compositions

A. Rubber Compositions

The following rubber compositions, Tables 1-4, were prepared by two-pass Banbury mixing according to ASTM D3182-89.

TABLE 1

| 30/70 NR/BR rubber composition | |
|---|---|
| Composition | Phr |
| Natural rubber | 30 |
| Butadiene rubber | 70 |
| Carbon Black | 70 |
| Zinc Oxide | 3 |
| Stearic Acid | 1 |
| Antioxidant | 0.25 |
| Aromatic Oil | 16.5 |
| Ozone protective wax | 0.5 |
| 6-p-Phenylenediamine | 1 |
| Sulfur | 2 |
| N-tert-2-benzothiazolesulfonamide | 3 |
| N-cyclohexylthiophthalimide | 0.2 |
| Tackifying Resin | 4 |

TABLE 2

| 70/30 SBR/BR rubber composition | |
|---|---|
| Composition | phr |
| Styrene butadiene rubber | 70 |
| Butadiene rubber | 30 |
| Carbon Black | 70 |
| Zinc Oxide | 6 |
| Stearic Acid | 1.5 |
| Aromatic Oil | 33 |
| 6-p-Phenylenediamine | 1 |
| Sulfur | 1.8 |
| N-tert-2-benzothiazolesulfonamide | 1.8 |
| Tackifying Resin | 1 |

TABLE 3

| 100% Natural Rubber, NR Blank | |
|---|---|
| Composition | Phr |
| Natural rubber | 100 |
| Carbon Black | 55 |
| Zinc Oxide | 6 |
| Stearic Acid | 2 |
| HMT Hexamethylenetetramine | 2.5 |
| Aromatic Oil | 4 |

TABLE 3-continued

100% Natural Rubber, NR Blank

| Composition | Phr |
|---|---|
| Silica | 15 |
| 6-p-Phenylenediamine | 1 |
| Sulfur | 2.5 |
| N-tert-2-benzothiazolesulfonamide | 0.9 |
| Tackifying Resin | 0 |

TABLE 4

100% Natural Rubber, NR

| Composition | Phr |
|---|---|
| Natural rubber | 100 |
| Carbon Black | 55 |
| Zinc Oxide | 6 |
| Stearic Acid | 2 |
| HMT Hexamethylenetetramine | 2.5 |
| Aromatic Oil | 4 |
| Silica | 15 |
| 6-p-Phenylenediamine | 1 |
| Sulfur | 2.5 |
| N-tert-2-benzothiazolesulfonamide | 0.9 |
| Tackifying Resin | 4 | phr = per hundred rubber

B. Evaluation of Rubber Compositions

Rubber compositions containing tackifying resins of the invention were evaluated using the following tests:

Mooney Scorch, ASTM D1646-03: Standard Test Methods for Rubber-Viscosity, Stress Relaxation, and Pre-Vulcanization Characteristics (Mooney Viscometer). Mooney viscosity is defined as the shearing torque resisting rotation of a cylindrical metal disk (or rotor) embedded in rubber within a cylindrical cavity. When disk rotation is abruptly stopped, the torque or stress on the rotor decreases at some rate depending on the rubber being tested and the temperature of the test. This test measures this stress relaxation. Mooney scorch values were determined on a Mooney Viscometer at 121° C., and represent the compounds' resistance to premature vulcanization. The values reported were the times required for a five-point rise from the minimum Mooney viscosity at the test temperature. Larger values represent a resistance to premature vulcanization; shorter times indicate a tendency to "scorch."

Oscillating Disk Rheometer ("ODR"), ASTM D2084-01: Standard Test Method for Rubber Property-Vulcanization Using Oscillating Disk Cure Meter. This test measures the use of the oscillating disk cure meter for determining selected vulcanization characteristics of vulcanizable rubber compounds. The tests were performed at 153° C. The parameters Rmin and Rmax are the minimum rheometer torque (before the onset of vulcanization) and the maximum rheometer torque (due to vulcanization), respectively. The parameter t90 is the time required for the occurrence of 90% of the increase in torque due to vulcanization (time at R/(Rmax−Rmin) =0.90).

Rebound Resilience, DIN 53512: Determination the rebound resilience of rubber using the Zwick rebound pendulum for determining the rebound resilience of rubber. The rebound resilience R is the ratio of the energy recovered to the energy expended.

Hardness, DIN 53505: Shore A and Shore D hardness testing of rubber. The Shore hardness is the resistance exercised by the test material to a body of defined shape being pressed into it under a defined spring pressure. Shore A for soft rubber, Shore D for Ebonite/hard rubber.

C. Test Results of Rubber Compositions Containing Various Tackifying Resins

Table 5 reports the test results of a 30/70 NR/BR rubber composition containing Resin O or T8000 resin as the tackifying resin. The rubber composition containing Resin O has superior tack compared to the rubber composition containing T8000.

TABLE 5

| Tackifying Resin | Tack 1 day | Tack 3 day | Tack 8 day | Mooney Scorch t5 | ODR Cure t90 | Rebound Resilience % |
|---|---|---|---|---|---|---|
| Resin O (4 phr) | 106.5 | 122.1 | 149.9 | 16.26 | 8.4 | 50.4 |
| T8000 (4 phr) | 101.9 | 111.7 | 117.2 | 15.55 | 8.24 | 49.6 |

Table 6 reports the test results of a 100% NR composition containing Resin O and Resin B as tackifying resins. The control composition (Blank) which did not have any tackifier for comparison purpose has very low tackiness (0.2) as shown in Table 6. Compared with the Blank, the rubber compositions containing Resin O or Resin B as a tackifying resin show a considerable increase in tackiness.

TABLE 6

| Tackifying Resin | Tack 1 day | Tack 3 day | Tack 8 day | Mooney Scorch t5 | ODR Cure t90 | Rebound Resilience % | Hardness Shore A |
|---|---|---|---|---|---|---|---|
| Resin O | 16.7 | 15.8 | 15.7 | 9.08 | 10.75 | 41.8 | 71 |
| Resin B | 17.7 | 13.9 | 18.6 | 8.76 | 10.69 | 41.1 | 74 |
| Blank | 13.6 | 15.2 | 11.9 | 10.17 | 9.7 | 43.9 | 74 |

Rubber compositions of 70/30 SBR/BR rubbers with various tackifing resins were prepared. Table 7 compares the tack of 70/30 SBR/BR rubber containing Resin B, a tackifying resin of the invention, versus known tackifying resins: T8000, T2300, T6000, and T2000. The Resin B tackifying resin yields superior tack performance in comparison to other tackifying resins.

TABLE 7

| Tackifying resin | Tack 1 day | Tack 3 day | Tack 8 day |
|---|---|---|---|
| T8000 | 1.0 | 0.8 | 0.5 |
| T2300 | 1.0 | 0.9 | 0.5 |
| T6000 | 0.7 | 0.6 | 0.6 |
| T2000 | 0.5 | 0.4 | 0.5 |
| Resin B | 4.5 | 5.1 | 3.9 |

The invention claimed is:

1. A modified, hydrocarbylphenol-aldehyde resin prepared by reacting an epoxide with a resin of Formula (I) in the presence of a basic catalyst and at a basic pH,

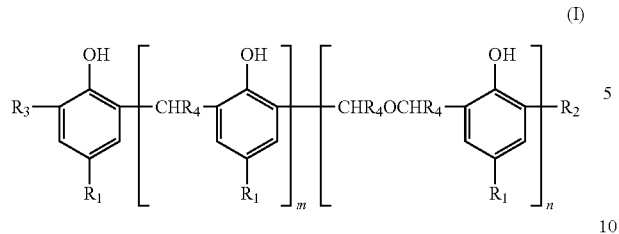

wherein
R₁ is a straight or branched $C_1$-$C_{30}$ alkyl;
R₂ is —CH₂R₅,
  wherein R₅ is an amine of the formula (i)

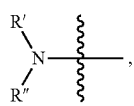

wherein R' and R" are independently H, $C_1$-$C_6$ alkyl, $C_2$-$C_6$ alkenyl, $C_2$-$C_6$ alkynyl, aryl, or wherein R' and R", together with the N carrying them, form a 5-7 membered heterocyclic ring;
R₃ is R₂ or —CH(R₅)OH;
R₄ is H or $C_1$-$C_4$ alkyl; and
m plus n is at least 1 wherein the epoxide is an epoxide prepared from a $C_4$-$C_{60}$ α-olefin.

2. The modified, hydrocarbylphenol-aldehyde resin of claim 1, wherein said resin is prepared by reacting about 1 to about 25 weight percent of an epoxide with a resin of Formula (I).

3. The modified, hydrocarbylphenol-aldehyde resin of claim 1, wherein the epoxide is a straight-chain $C_4$-$C_{22}$ alkyl epoxide.

4. The modified, hydrocarbylphenol-aldehyde resin of claim 3, wherein the epoxide is a straight-chain $C_6$-$C_{16}$ alkyl epoxide.

5. The modified, hydrocarbylphenol-aldehyde resin of claim 1, wherein R₅ is morpholinyl.

6. The modified, hydrocarbylphenol-aldehyde resin of claim 1, wherein R₁ is a straight or branched $C_1$-$C_{15}$ alkyl.

7. The modified, hydrocarbylphenol-aldehyde resin of claim 6, wherein R₁ is tertiary butyl or tertiary octyl.

8. A process for preparing a modified, hydrocarbylphenol-aldehyde resin comprising the step of:
(a) reacting an epoxide with a resin of Formula (I) in the presence of a basic catalyst and at a basic pH,

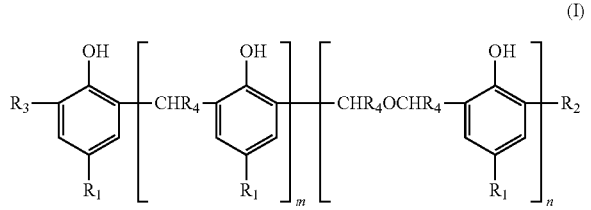

wherein
R₁ is a straight or branched $C_1$-$C_{30}$ alkyl;
R₂ is —CH₂R₅,
  wherein R₅ is an amine of the formula (i)

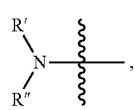

wherein R' and R" are independently H, $C_1$-$C_6$ alkyl, $C_2$-$C_6$ alkenyl, $C_2$-$C_6$ alkynyl, aryl, or wherein R' and R", together with the N carrying them, form a 5-7 membered heterocyclic ring;
R₃ is R₂ or —CH(R₅)OH;
R₄ is H or $C_1$-$C_4$ alkyl; and
m plus n is at least 1 wherein the epoxide is an epoxide prepared from a $C_4$-$C_{60}$ α-olefin.

9. A process for preparing a modified, hydrocarbylphenol-aldehyde resin according to claim 8, wherein step (a) comprises reacting about 1 to about 25 weight percent of the epoxide.

10. A rubber composition having improved tack comprising
a rubber or mixtures of rubbers, and
0.5 to 7 phr of a modified, hydrocarbylphenol-aldehyde resin of claim 1.

11. The rubber composition of claim 10, wherein said hydrocarbylphenol-aldehyde resin ranges from 1 to 4 phr.

12. The rubber composition of claim 10, wherein said hydrocarbylphenol-aldehyde resin is prepared by reacting about 1 to about 25 weight percent of an epoxide with a resin of Formula (I).

13. The rubber composition of claim 10, wherein said epoxide is a straight-chain $C_4$-$C_{22}$ alkyl epoxide.

14. The rubber composition of claim 13, wherein said epoxide is a straight-chain $C_6$-$C_{16}$ alkyl epoxide.

15. The rubber composition of claim 10, wherein the epoxide is a $C_{16}$ alkyl epoxide.

16. The modified, hydrocarbylphenol-aldehyde resin of claim 1, wherein the epoxide is a $C_{16}$ alkyl epoxide.

17. The rubber composition of claim 10, wherein R₅ is morpholinyl.

18. The rubber composition of claim 10, wherein R₁ is a straight or branched $C_1$-$C_{15}$ alkyl.

19. The rubber composition of claim 18, wherein R₁ is tertiary butyl or tertiary octyl.

20. The rubber composition of claim 10, wherein said rubber composition is a 30/70 natural rubber/butadiene rubber composition, a 70/30 styrene butadiene rubber/butadiene rubber composition, or a natural rubber composition.

* * * * *